United States Patent Office 2,767,372
Patented Oct. 16, 1956

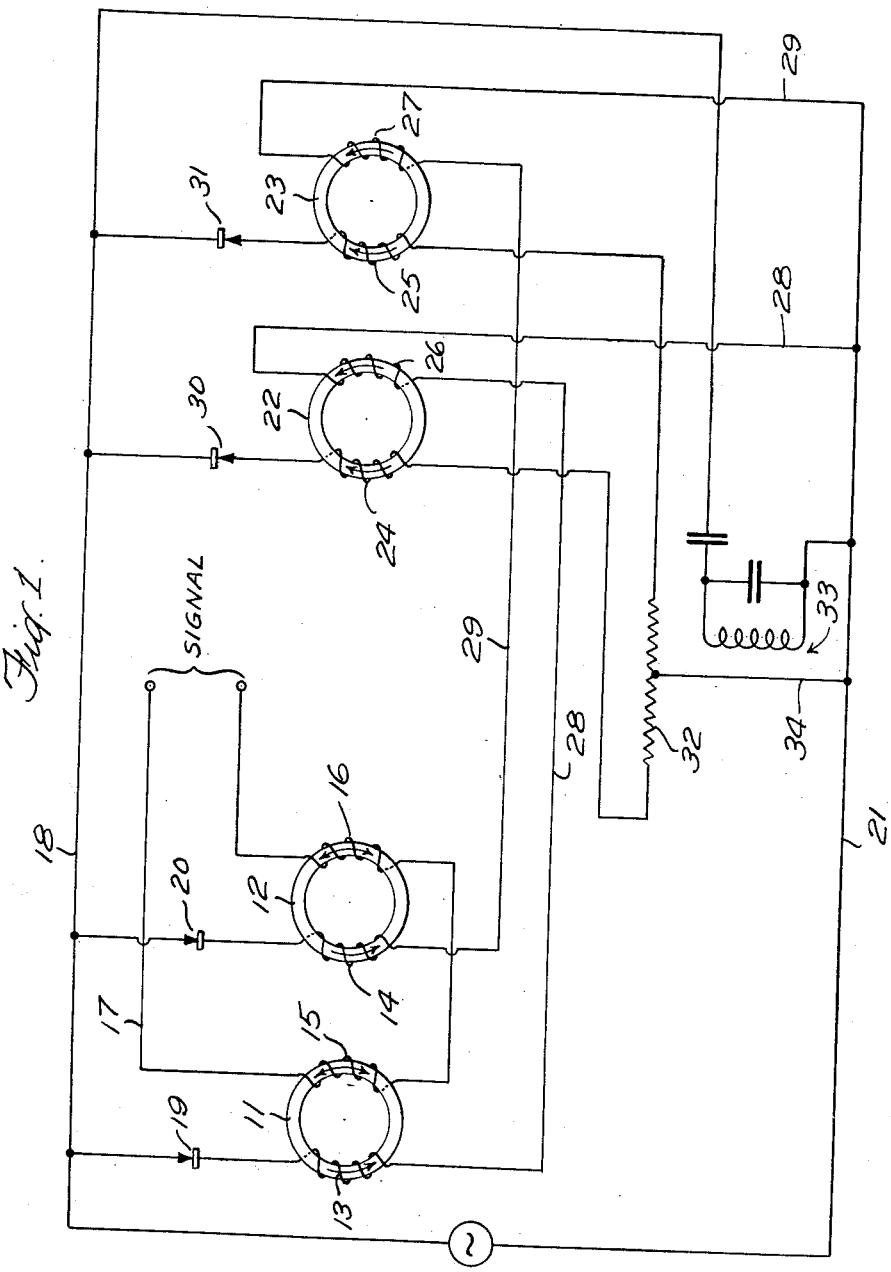

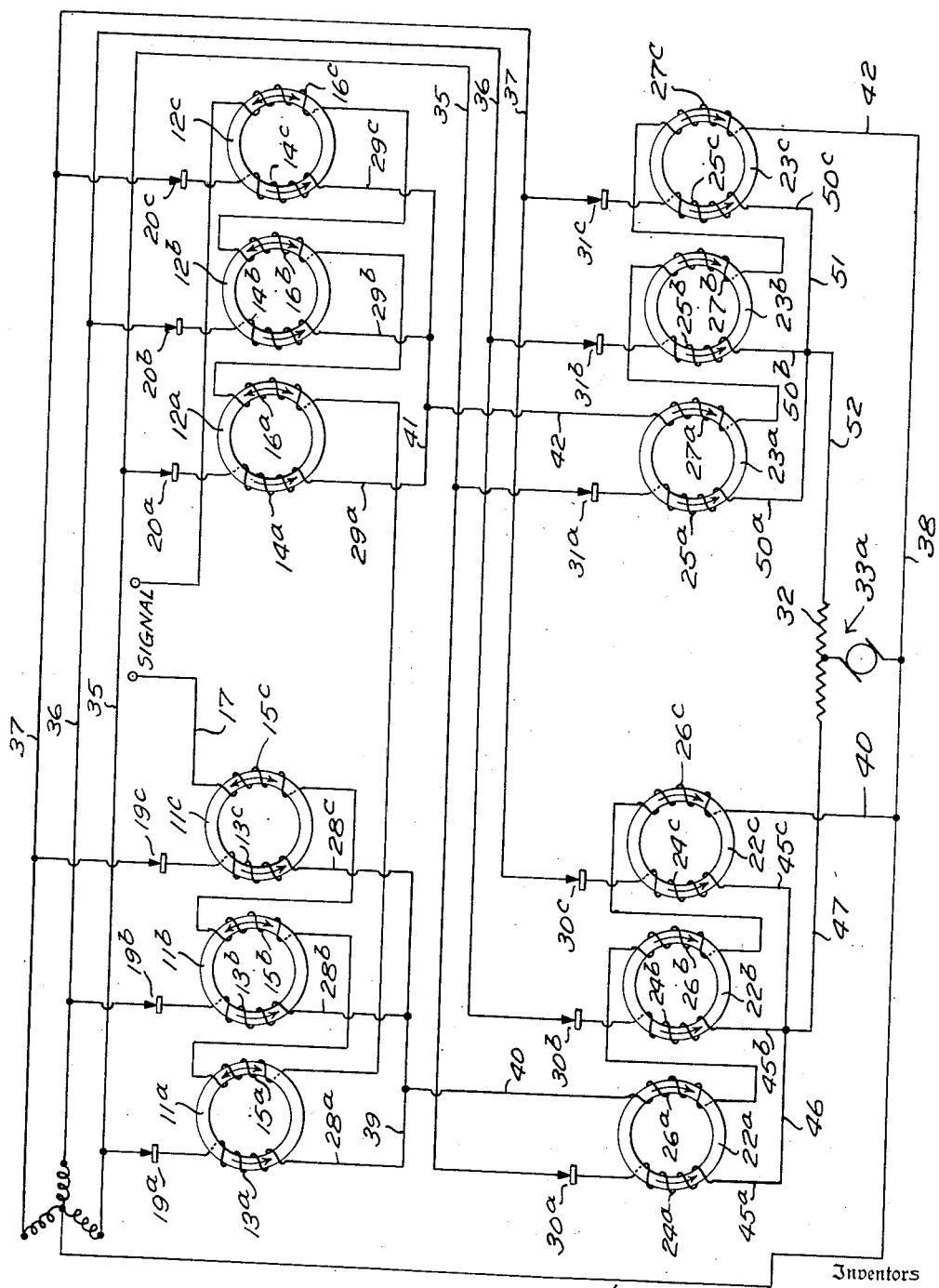

2,767,372

MULTISTAGE MAGNETIC AMPLIFIER SYSTEM

Lothair H. Rowley, Bellerose, and William R. Rauth, Jr., New Hyde Park, N. Y., assignors to Sperry Rand Corporation, a corporation of Delaware Application October 14, 1952, Serial No. 314,607

6 Claims. (Cl. 323—89)

This invention relates to electrical amplifying systems and especially to such systems employing magnetic amplifiers of the saturable core reactor type. The invention is particularly embodied in multistage systems and resides in the utilization of the output of one stage to provide both a biasing current and a control current to the magnetic circuits of the reactors of the next succeeding stage.

As presently contemplated the invention is best embodied in half wave rectifier systems in which each stage employs at least one pair of reactors having closed magnetic circuits with a load or output winding which is energized from an A. C. source and a control winding inductively related to each magnetic circuit. The control of the first stage differentially affects the impedance of the output circuits of each pair of reactors, and these outputs are fed to series windings inductively related to the magnetic circuits of respective reactors in the next stage.

The phase relation between the first and second stage is such that the pulses from the first stage precondition the flux levels in the cores of the second stage and determine the operating point on the hysteresis curve for these cores. In a polyphase current system this will be accompanied with the rectifiers feeding the same half cycle to the two stages, but in single phase systems the two stages will use alternate half cycles.

The invention will be understood from the following particular description of the embodiments of the invention illustrated in the accompanying drawings to which reference is now made.

Fig. 1 is a schematic drawing of a single phase system embodying the invention;

Fig. 2 is a similar drawing of a three phase system embodying the invention.

As shown in Fig. 1, the first stage has two reactors comprising closed ring cores 11 and 12 on which respectively are load or output windings 13 and 14 and control windings 15 and 16. The control windings are in series in the signal circuit 17 and are in push-pull relation to their respective output windings. Obviously a three legged core with a single control winding could be used in well known manner. The two output windings are connected to one side 18 of an A. C. line through similarly poled rectifiers or one-way conductors 19 and 20, respectively. The opposite ends of the windings 13 and 14 are connected to the other side 21 of the A. C. line through series control windings on the reactors of the next stage, as will now be described.

The second stage has also two reactors comprising independent ring type cores 22 and 23 on which respectively are load or output windings 24 and 25 and control windings 26 and 27. As will be explained, these control windings also constitute bias windings. Control winding 26 is in series in the output lead 28 of output winding 13 and control winding 27 is in series in the output lead 29 of output winding 14. One way conductors or rectifiers 30 and 31 respectively connect one end of windings 24 and 25 to the side 18 of the A. C. line and these rectifiers are similarly poled oppositely to rectifiers 19 and 20. The control windings 26 and 27 are similarly wound on their respective cores so that they vary the flux levels in their cores in the same sense. The outputs of the windings 24 and 25 constitute the load currents which are differentially combined for use in any suitable way. They may, for example, be used as biasing and control currents for a third stage, but for simplicity only two stages are shown and the outputs of windings 24 and 25 are used to energize the two halves of a center tapped split field winding 32 of a two phase A. C. motor 33, the center tap 34 being connected to side 21 of the A. C. line.

The directions of the flux induced by the several windings are indicated by arrows on their respective cores. Since the signal current may be D. C. and reversible as to its polarity, the arrows for windings 15 and 16 are shown as double headed, but these windings are so disposed that they control in opposite senses, that is, push-pull. The windings 13 and 14 are similarly disposed on their cores so that the direction of their induced fluxes is the same. If a three legged core be used with the control winding on the center leg, one of the output windings will be reversed.

The output windings 24 and 25 of the second stage are also similarly disposed on their cores so that their induced fluxes are in the same direction. As shown the control and biasing fluxes of windings 26 and 27 oppose those of output windings 24 and 25.

It will be observed that when there is no signal current the outputs of windings 13 and 14 will be equal and serves as a preset current in each winding 26 and 27. Since there is no differential control under that condition the current through both halves of the split stator winding 32 will be equal and there will be no torque on the rotor of the motor.

When signal current is received the impedance is increased in one of windings 13 and 14 and decreased in the other. Therefore the currents through windings 26 and 27 will be unequal and the impedances in the two legs of the second stage will correspondingly vary, causing the rotor of motor 33 to rotate in the direction dictated. The reversal of the signal current affects a corresponding reversal of the motor.

Fig. 2 shows the same principle applied to a three phase circuit, the motor 33a in this case being shown as a D. C. motor, the armature brushes taking the place of the center tap 34 to the split field winding 32.

In this case the three phase conductors 35, 36 and 37 are connected to a common neutral 38, and instead of one pair of reactors in each stage there are three pairs. The cores of one set of three corresponding to core 11 are numbered 11a, 11b and 11c, respectively, and their respective windings corresponding to windings 13 and 15 are numbered 13a, 13b and 13c, and 15a, 15b and 15c, respectively. Winding 13a is connected to conductor 35 through rectifier 19a, winding 13b is connected to conductor 36 through rectifier 19b and winding 13c is connected to conductor 37 through rectifier 19c. The output leads 28a, 28b and 28c of these windings are coupled through conductor 39 which is connected to the neutral lead 38 by conductor 40 as will be described. The control windings 15a, 15b and 15c are connected in series to one side of the signal current 17 and are so wound that they all control in the same sense.

The three cores of the other set corresponding to core 12 in the first stage are numbered 12a, 12b and 12c, respectively, the three load coils in those cores corresponding to winding 14 are numbered 14a, 14b and 14c, respectively, and the three control windings corresponding to winding 16 are numbered 16a, 16b and 16c, respectively.

These latter windings are connected in series and are wound so that their control is effective in the same sense. Winding 14a is connected to phase conductor 35 through rectifier 20a, winding 14b is connected to phase conductor 36 through rectifier 20b and winding 14c is connected to phase conductor 37 through rectifier 20c. These three rectifiers are all poled in the same direction which in this case is the same as that of the rectifiers 19a, 19b and 19c. The output leads 29a, 29b and 29c of the three output windings are coupled by conductor 41 which is connected by lead 42 to the neutral lead, as will be described.

In the second stage the set of three cores corresponding to core 22 are numbered 22a, 22b and 22c, respectively, the respective control windings being numbered 26a, 26b and 26c. The three output windings are respectively connected to the three phase conductors through leads including rectifiers 30a, 30b and 30c. These rectifiers are all poled in the same direction as are the rectifiers in the first stage. The control windings are all disposed in series in the conductor 40 and are all similarly wound on their cores so that their control is effective in the same sense. The three output leads of the output or load coils are numbered 45a, 45b and 45c and are coupled by conductor 46 which is connected by lead 47 to one side of the split field 32.

The other set of three reactors in the second stage comprises the three cores corresponding to core 23 and numbered 23a, 23b and 23c, respectively, with output windings 25a, 25b and 25c, respectively, and control windings 27a, 27b and 27c, respectively. The three output windings are connected to the respective phase conductors by leads including rectifiers 31a, 31b and 31c, respectively, which are poled in the same direction as the other rectifiers in the system.

The three control windings of this set are connected in series in the lead 42 and are wound so that their control is in the same sense. The output leads of the three output windings, numbered, 50a, 50b and 50c, respectively, are coupled by conductor 51 which is connected by lead 52 to the other side of the split field winding 32.

The control windings in the second stage are so wound that their induced flux tends to increase the impedance of the output circuits. The successive impulses of the current in the control windings are spaced one hundred and twenty electrical degrees and since each controlled winding is pulsed once on each half cycle, there is inevitably a control impulse on each non-conductive half cycle of the controlled current. For this reason the rectifiers for the output circuits of the second stage may be poled in the same direction as those for the first stage and are so shown.

In general the operation is the same as that previously described with reference to Fig. 1. With zero signal current the outputs of the two legs of the first stage are equal and there is the same preset or bias current in the two sets of reactors of the second stage. A signal current throws the controls out of balance in a direction depending upon the polarity of the signal current. This will increase the impedance of one set of output circuits in the second stage and decrease the impedance in the other set. This causes the current in one half of the field winding 32 to predominate over the other and cause rotation of the armature in the dictated direction. A reversal of the signal current reverses the motor.

It is obvious that the invention may be otherwise embodied so as to provide a multiple stage circuit in which the output of each preceding stage both presets and controls the next stage and obtains a differential output of the two legs of the next succeeding stage.

What is claimed is:

1. A multistage magnetic amplifier, the first stage comprising a core structure forming a pair of closed magnetic circuits, an output winding on each magnetic circuit, an A. C. line, the two output windings being connected in parallel across the A. C. line, an input control circuit for the first stage independent of the A. C. line and including a control winding on each magnetic circuit, the two control windings being disposed in push-pull relation to the output windings, the second stage comprising two cores forming a pair of independent closed magnetic circuits, an output winding on each of the second stage magnetic circuits, the two second stage output windings being connected in parallel across the A. C. line, a control winding on each of the second stage magnetic circuits, one of said second stage control windings being connected in series with each of the first stage output windings, and a unidirectional conducting device in series with each output winding, those in each stage being similarly poled.

2. A multistage magnetic amplifier as defined in claim 1 in which the control windings of the second stage are wound on their cores so as to vary in the same sense the fluxes induced in their respective cores by their respective output windings.

3. A multistage polyphase system for amplifying the effect of relatively weak input currents, each stage comprising a plurality of pairs of closed magnetic circuits, an output winding on each magnetic circuit, a source of poly-phase current having one phase for each pair of magnetic circuits and separate conductors for the several phases connected to a common neutral, the output windings on each pair of magnetic circuits in each stage having one end connected to the same phase conductor and the windings of the several pairs being respectively thus connected to different phase conductors, an input control circuit for the first stage independent of the source of polyphase current and including a control winding on each magnetic circuit, said control windings being arranged in push-pull relation on each pair of magnetic circuits, means conductively coupling the other ends of the output windings which are controlled in one sense, separate means conductively coupling the other ends of the output windings which are controlled in the opposite sense, means conductively coupling the other ends of the output windings on one-half of the magnetic circuits in the second stage, separate means conductively coupling the other ends of the output windings on the other half of the magnetic circuits in the second stage, load means connected with said neutral, conductive means differentially connecting the two said coupling means for the output windings of the second stage to said load means, control windings on each magnetic circuit of the second stage, means conductively connecting the control windings on each half of the magnetic circuits of the second stage in series to the said neutral and to one of the coupling means for the output windings of the first stage, and a unidirectional conducting device in series with each output winding, those in each stage being similarly poled.

4. A multistage magnetic amplifier as defined in claim 3 in which the control windings of the second stage are wound on their cores so as to vary in the same sense the fluxes induced in their respective cores by their respective output windings.

5. A three phase, two stage magnetic amplifier circuit, each stage comprising three pairs of closed magnetic circuits, an output winding on each magnetic circuit, a source of three phase current and a separate conductor for each phase, the three conductors having a common neutral, the two output windings on each pair of magnetic circuits in each stage being connected to one end to the same phase conductor and those on the different pairs being connected to different phase conductors, a unidirectional conducting device in each phase connection, the said devices in each stage being similarly poled, an input control circuit for the first stage independent of the source of three-phase current and including a control winding on each magnetic circuit, said control windings being arranged in push-pull on each pair of magnetic circuits in the first stage, means conductively coupling the other ends of the first stage output windings which are controlled in one sense, separate means conductively coupling the other ends of the first stage output windings which are controlled in the opposite sense, means conductively coupling the other ends of the output windings on three of the magnetic circuits in the second stage, separate means conductively coupling the other ends of the output windings on the other three magnetic circuits in the second stage, load means connected with said neutral, conductive means differentially connecting the two said coupling means for the output windings of the second stage to said load means, control windings on each magnetic circuit of the second stage, and means conductively connecting the control windings on each said group of three magnetic circuits of the second stage in series to the said neutral and to one of the coupling means for the output windings of the first stage.

6. A three phase, two stage magnetic amplifier circuit as defined in claim 5 in which the control windings of the second stage are wound on their cores so as to vary in the same sense the fluxes induced in their respective cores by their respective output windings.

References Cited in the file of this patent

UNITED STATES PATENTS

| | | |
|---|---|---|
| 2,259,647 | Logan | Oct. 21, 1941 |
| 2,554,203 | Morgan | May 22, 1951 |
| 2,555,992 | Ogle | June 5, 1951 |
| 2,578,405 | Downie | Dec. 11, 1951 |
| 2,622,239 | Bracutt | Dec. 16, 1952 |